United States Patent
Wu et al.

(10) Patent No.: US 7,621,429 B2
(45) Date of Patent: Nov. 24, 2009

(54) PISTON TANK WITH COMPOUND PISTON FOR HIGH LOADING AND EXPULSION EFFICIENCY

(75) Inventors: Peikuan Wu, Fairfax, VA (US); Guy B. Spear, Marshall, VA (US)

(73) Assignee: Aerojet- General Corporation, Sacramento, CA (US)

( * ) Notice: Subject to any disclaimer, the term of this patent is extended or adjusted under 35 U.S.C. 154(b) by 733 days.

(21) Appl. No.: 11/363,573

(22) Filed: Feb. 27, 2006

(65) Prior Publication Data
US 2007/0199957 A1   Aug. 30, 2007

(51) Int. Cl.
*B67D 5/42* (2006.01)
(52) U.S. Cl. .......... 222/389; 222/386.5; 222/394; 222/326
(58) Field of Classification Search ........... 222/386.5, 222/389, 386, 334, 326–327, 394; 92/192, 92/165 R, 169.1, 172
See application file for complete search history.

(56) References Cited

U.S. PATENT DOCUMENTS

| | | | |
|---|---|---|---|
| 4,213,545 A * | 7/1980 | Thompson et al. | 222/386.5 |
| 4,533,067 A | 8/1985 | Sansevero, Jr. et al. | |
| 4,762,293 A | 8/1988 | Waddington | |
| 4,925,061 A * | 5/1990 | Jeromson et al. | 222/1 |
| 5,042,365 A | 8/1991 | Rosman | |
| 5,042,696 A * | 8/1991 | Williams | 222/340 |
| 5,115,948 A * | 5/1992 | Johnson | 222/209 |
| 5,133,183 A | 7/1992 | Asaoka et al. | |
| 5,150,820 A * | 9/1992 | McGill | 222/95 |
| 5,312,018 A * | 5/1994 | Evezich | 222/95 |
| 5,648,052 A | 7/1997 | Schaefer et al. | |
| 5,921,167 A | 7/1999 | Giesy et al. | |
| 5,972,136 A | 10/1999 | Wagaman | |
| 6,234,360 B1 * | 5/2001 | Bockmann et al. | 222/327 |
| 6,325,384 B1 | 12/2001 | Berry, Sr. et al. | |

OTHER PUBLICATIONS

Palaszewski, Bryan; "Metallized Gelled Propellants: Oxygen/RP-1/ Aluminum Rocket Combustion Experiments"; 1995, *31st Joint Propulsion Conference and Exhibit AIAA/ASME/SAE/ASEE*, 33 pages.

* cited by examiner

*Primary Examiner*—Frederick C. Nicolas
(74) *Attorney, Agent, or Firm*—Townsend and Townsend and Crew LLP.; M. Henry Heines

(57) ABSTRACT

A piston tank with elongated contact between the piston and the tank bore to prevent piston cocking and preserve alignment is equipped with a compound piston that includes a carriage (or glider) and a barrier that is movable relative to the carriage. The carriage is an elongate ring with sealing and contact sites between the ring and the tank bore and axially spaced apart, and the barrier moves or changes shape in response to pressure differentials across the barrier imposed by a pressurized driving fluid. The barrier and carriage can thus move between a position allowing the full volume of the tank to be occupied by fuel or other functional fluid and a position ejecting all of the fuel or functional fluid out of the tank through an outlet port. Two examples of the barrier are disclosed—a plate that is movable within the ring and a diaphragm affixed to the ring and deformable in both directions.

10 Claims, 3 Drawing Sheets

PISTON TANK WITH COMPOUND PISTON FOR HIGH LOADING AND EXPULSION EFFICIENCY

FEDERALLY SPONSORED RESEARCH OR DEVELOPMENT

The U.S. Government has a paid-up license in this invention and the right in limited circumstances to require the patent owner to license others on reasonable terms as provided for by the terms of contract no. DAAH01-03-C-R104 awarded by the United States Army.

BACKGROUND OF THE INVENTION

1. Field of the Invention

This invention resides in the field of storage tanks and systems for retaining fluids, particularly viscous fluids, and specifically relates to tanks that utilize internal pistons driven by pressurized process fluids to eject the tank contents at a controlled rate.

2. Description of the Prior Art

Piston tanks are used for the transport or storage of fluid or semi-solid materials that are to be drawn directly from a sealed vessel at their site of use. The propulsion systems in certain types of aircraft and spacecraft that are propelled by fuels in the form of viscous liquids or gels are examples of systems that benefit from power plants that contain piston tanks. The constant or variable pressure that a hydraulic or pneumatic piston can apply to the fuel or tank contents in general assures a high degree of control over the propulsive force or the rate of ejection in general where controlled ejection is needed. Air- or fluid-actuated pistons offer the particular advantage of remote control with a minimum of mechanical components.

As with pistons in general, the pistons in piston tanks must be capable of movement while forming a reliable seal against the tank wall. When the material to be ejected is combustible, corrosive, or otherwise damaging to the system components on the pressurization side of the piston, the integrity of the seal is particularly important since leakage of the material past the piston can cause equipment damage or malfunction and possibly injury. Furthermore, in many applications, of which aircraft is an example, the spatial volume occupied by the piston tank is an important factor in the efficiency of the system. The goal in rocket engines, for example, is to carry as much fuel as possible in a tank of minimal volume. For this reason, a goal is to minimize or eliminate the portion of the tank volume that is not occupied by fuel.

The integrity of the seal between the piston and the tank also requires that the piston be constructed in a manner that reduces or eliminates the risk of cocking of the piston, i.e., deviation of the piston from axial alignment when actuating pressure is applied. Distortion of the tank bore due to piston cocking and scoring of the bore due to abrasion from particles or debris wedged between the piston and the bore are to be avoided in order to maintain an effective seal and a functioning system. A convenient and effective means of avoiding piston cocking is by the use of a piston with an elongated sealing surface, i.e., one with shear seals extending a short distance along the axis of the piston rather than a single O-ring type seal. An elongated piston head however consumes valuable cylinder volume that could otherwise be used to carry fuel.

SUMMARY OF THE INVENTION

The concerns enumerated above are addressed by the present invention, which resides in a piston tank with a pressure-driven piston that has a compound structure that includes a carriage and a movable barrier mounted to the carriage, the carriage having a sealing surface that is elongated in the direction of the tank axis. Both the barrier and carriage are individually movable within the tank, and the barrier is movable relative to the carriage when a pressure differential is imposed across the barrier. The barrier is illustrated herein by two examples, one of which is a movable plate and the other a deformable diaphragm, both dividing the tank interior into two compartments: a compartment for fuel on one side of the barrier and a compartment for driving fluid on the other, the driving fluid being the pressurized medium that drives the piston. Whether the barrier is a plate or a diaphragm, the barrier moves independently of the carriage between one extreme where the barrier has been shifted, relative to the carriage, toward one end of the tank and another extreme where the barrier has been shifted toward the other end. With movement of both the barrier (plate or diaphragm) and the carriage, the partition that the barrier and carriage collectively form to divide the tank into a fuel compartment and a driving fluid compartment will move between a position in which the fuel compartment occupies the entire tank volume, or all but a minimal portion of the tank volume, and a position in which the driving fluid volume is expanded to such an extent that all fuel, or all but a minimal amount, has been forced out of the tank.

In preferred embodiments, the carriage is an elongated ring, which can also be referred to as a glider. The ring functions as a piston head, forming a fluid-tight dynamic seal between itself and the inner wall of the piston tank. When the barrier is a plate, the plate is movably mounted to or retained within the ring. When the pressure differential across the plate is large enough to overcome the inertia of the plate as well as the friction forces between the plate and ring and any additional resistance to the movement of the plate such as back pressure from the fuel, the pressure differential causes the plate to travel longitudinally within the ring. When the plate reaches the end of the ring in the direction of the fuel outlet port and the pressure differential across the plate is large enough to further overcome the inertial force of the ring and the friction forces between the ring and the tank wall, the plate advances the ring as well. Because of the ability of the plate to move within the ring, the full volume of the tank, or a volume close to the full volume, can be used for storage of the fuel without limitation on the length of the ring. The extended length of the ring, and particularly the extended contact length between the ring and the tank wall, assures that the ring axis will remain aligned with the tank axis at all points along the path of travel of the ring, without cocking of the ring or sacrificing any portion of the tank volume that can otherwise be used for the fuel.

When the barrier is a diaphragm, the diaphragm is likewise affixed to the elongated ring, spanning the ring opening. Instead of responding to the pressure differential by traveling along the length of the ring, however, the diaphragm is preferably fixed to the ring and responds by stretching or extending in either direction. The resulting deformation of the diaphragm produces a result analogous to the movement of the plate in the embodiment described above. When the tank is fully loaded with fuel, the diaphragm will be fully retracted in the direction that will provide maximal volume on the fuel side of the diaphragm, i.e., it will be fully retracted toward the driving fluid inlet port. Pressure applied to the diaphragm by the driving fluid will then cause the diaphragm to bow in the opposite direction, pressing against the fuel to force the fuel out of the tank. With sufficient pressure on the diaphragm, the diaphragm will force the supporting ring to move as well, the two moving together as a unit to force all fuel out.

These and other features, objects and advantages of the invention will be apparent from the description that follows.

BRIEF DESCRIPTION OF THE DRAWINGS

FIG. 1b is an enlargement of one portion of the cross section of FIG. 1a.

DETAILED DESCRIPTION OF THE INVENTION AND PREFERRED EMBODIMENTS

The terms used herein to describe the invention and its components are intended to have the same meaning that they have in the art, except where otherwise indicated. This paragraph seeks however to clarify certain terms that are used in this specification and the appended claims. The term "dynamic seal" denotes a seal between two parts that maintains its sealing function while one of the parts moves relative to the other. The term "sliding contact seal" is a form of dynamic seal that maintains sliding contact with at least one of the two surfaces as one surface moves relative to the other. The terms "cylinder" and "cylindrical" are used herein to denote a surface generated by a straight line tracing a closed planar curve while remaining perpendicular to the plane defined by the curve. The term is not limited to circular cylinders, although circular cylinders are preferred. Circular cylinders are bodies of revolution about an axis. In the piston tanks of the present invention, the axis is the longitudinal tank axis. The term "cylindrical tank" denotes a tank that has a cylindrical wall and is closed at both ends by end walls. The end walls can be flat, dome-shaped, or tapered, and if flat, the end walls can be either perpendicular to the cylindrical wall or at an angle thereto. Flat end walls that are perpendicular to the cylindrical wall and shallow dome-shaped walls are preferred for tanks in which the barrier is a plate, while dome-shaped end walls are preferred for tanks in which the barrier is a diaphragm. The term "fluid" is used herein to denote any non-solid material, such as a liquid, gas, or semi-solid (i.e., gel), that can fill a volume and be forced through an orifice. The term "driving fluid" and its alternate term "actuating fluid" denote the fluid that presses against the barrier to produce the pressure differential that forces the fuel out of the tank. The driving or actuating fluid can be a gas or liquid, and is preferably an inert gas such as nitrogen. Finally, the term "fuel" is used herein for convenience; the tank can be used to store and deliver any functional fluid that is to be transported in the tank and stored in the tank until ready for use.

While the novel features defining this invention can be implemented in a wide range of piston tank constructions, an understanding of these features as applied to all such constructions can be gained by a detailed review of specific embodiments of the invention. Two such embodiments are depicted in the Figures and described below.

Figure 1A:
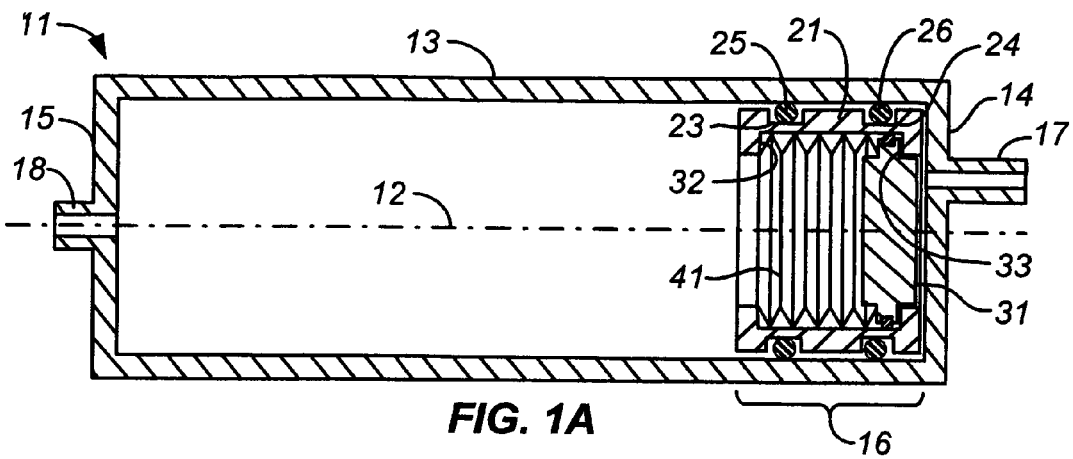
FIG. 1a is a cross section of one type of piston tank embodying the present invention.
Figure 1B:
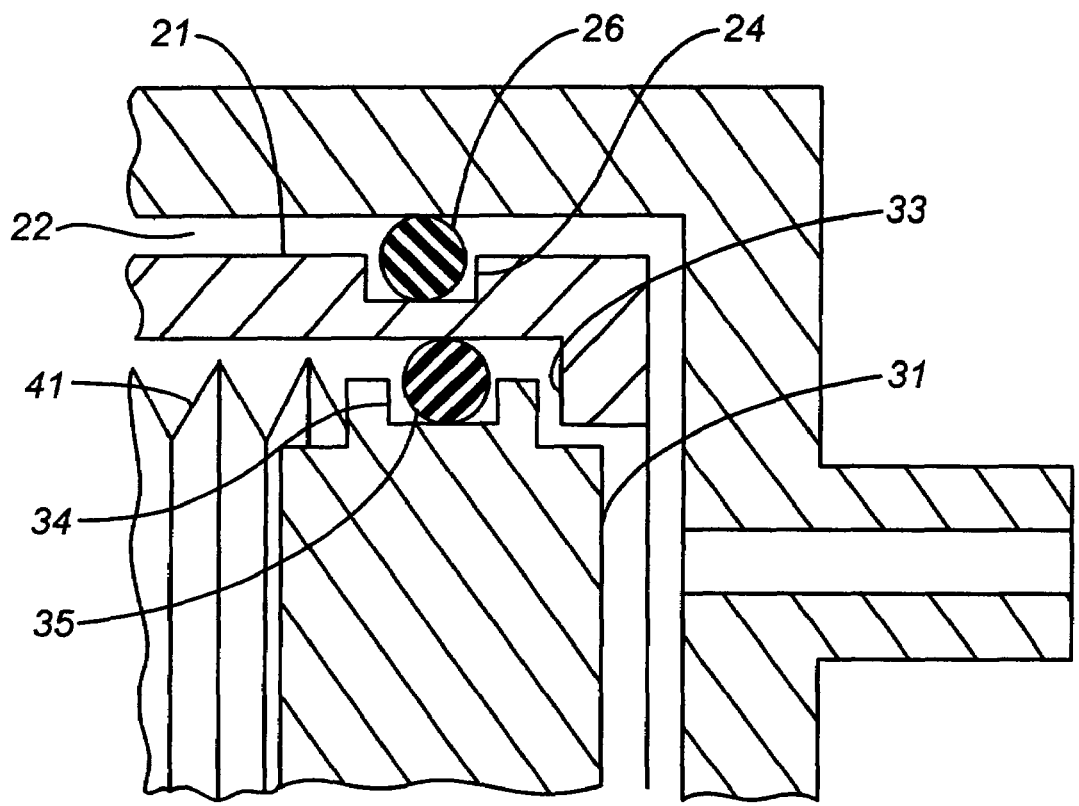

FIGS. 1a, 1b, 2, and 3 illustrate a piston tank in accordance with the invention in which the barrier is a plate. The piston tank is shown in three stages, respectively, from fully charged with functional fluid (e.g., fuel) to fully emptied. FIGS. 1a and 1b illustrate the tank with the compound piston fully retracted, the tank thus fully charged with functional fluid. The tank 11 is a body of revolution about a longitudinal axis 12 with a cylindrical side wall 13 and end walls at its two ends, the two ends being designated an actuator end 14 and a delivery end 15. The compound piston 16 resides inside the tank 11. Pressurized gas is used as the actuator fluid (i.e., the driving fluid), and the actuator end 14 contains a port 17 that serves as an inlet for the pressurized gas. At the delivery end 15 of the tank is a second port 18 that serves as an outlet for the functional fluid.

The elongate ring 21 that forms part of the compound piston 16 in this embodiment is a cylinder that is shorter in length than the tank 13, and fits inside the tank interior with a small gap 22, visible in the enlarged detail of FIG. 1b, between the outer surface of the ring and the internal wall surface of the tank to allow the ring to move inside the tank in the axial direction. Two grooves 23, 24 (FIG. 1a, with one of the grooves 24 more clearly visible in FIG. 1b) encircle the ring along its outer surface to accommodate elastomeric loops or O-rings 25, 26 (FIG. 1a, with one of the loops 26 more clearly visible in FIG. 1b) that are compressed between the floor of each groove and the tank wall, thereby providing full contact with both the groove and the wall and sealing the gap 22 to prevent fluid passage. The elastomeric loops 25, 26 are sufficiently resilient and yet impermeable to gas and liquid to serve as dynamic seals, allowing the ring 21 to move longitudinally within the tank 11 without breaking the seal. The inclusion of two such loops 25, 26 spaced apart along the tank axis 12 centers the ring in the tank and maintains axial alignment of the ring relative to the tank to prevent cocking or any contact of the ring edges with the tank. The two loops thus serve both as seals to prevent leakage and as spacers to restrict the travel of the ring to the longitudinal direction, parallel to the axis 12. Alternatively, the spacing function of the loop pair can be achieved by non-deformable contacts, such as rings or protrusions of lubricated or self-lubricating material such as nylon or tetrafluoroethylene, or ball bearings or rollers. The spacing rings, protrusions, or bearings can be spaced apart from one or more sealing loops along the tank axis to function in conjunction with the sealing loop(s) in maintaining axial alignment of the ring. In general, axial alignment during travel of the elongate ring can be maintained by any sliding contact points that are spaced circumferentially around the ring periphery and longitudinally along the direction of the tank axis. Thus, the sealing and alignment functions can be met by as few as a single sealing ring and a single sealing loop or a single ring of lubricated protrusions or bearings axially spaced along the sealing ring. The advantage of using two or more sealing loops or bearing rings, however, is that each loop or bearing ring provides added assurance against leakage. Further alternatives are the inclusion of three or more sealing loops or bearing rings or an elastomeric sleeve that forms an elongated sealing surface.

The movable plate 31 fits inside the elongate ring 21 and is retained inside the ring by internal shoulders (inwardly directed flanges) 32, 33 (both shown in FIG. 1a, with one 33 of shown more clearly in FIG. 1b) on the ring, one shoulder at each of the two ends of the ring. A groove 34 (FIG. 1b) encircles the periphery of the plate and an elastomeric loop 35 resides within the groove to seal against the internal surface of the elongate ring 21. The loop 35 allows the plate 31 to travel longitudinally within the ring between the two shoulders 32, 33 while retaining the seal.

Joining the plate 31 to the ring 21 in this embodiment is a bellows 41, which serves various functions, either individually or at the same time. The bellows 41 can serve for example as a fluid barrier preventing fluid from passing around the plate 31 in either direction, i.e., preventing the functional fluid from leaking backward into the actuator side and preventing actuator fluid from leaking into the functional fluid. In serving this function, the bellows 41 supplements the elastomeric loop 35. To form an effective fluid barrier, the bellows 41 will be of fluid-impermeable material and will fully encircle the plate. The bellows can also impart resiliency or a biasing or spring-loading effect to the plate 31, thereby urging the plate into its fully retracted position until forced against the bellows by pressurized actuator fluid. When serving the biasing function only, the bellows need not retain fluid or fully encircle the plate 31. A third function is to maintain proper alignment of the plate 31 within the ring 21 and thereby prevent the plate from tipping relative to the tank axis 12. It is preferable that the bellows 41 at least serve the fluid barrier function to add to the sealing effect of the elastomeric loop 35.

Figure 2:
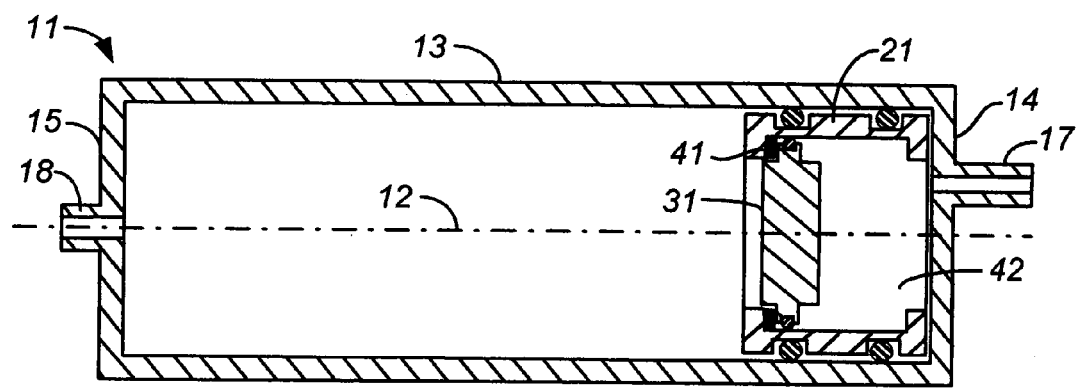
FIG. 2 is a cross section of the piston tank of FIG. 1a in a first stage of piston actuation.
Figure 3:
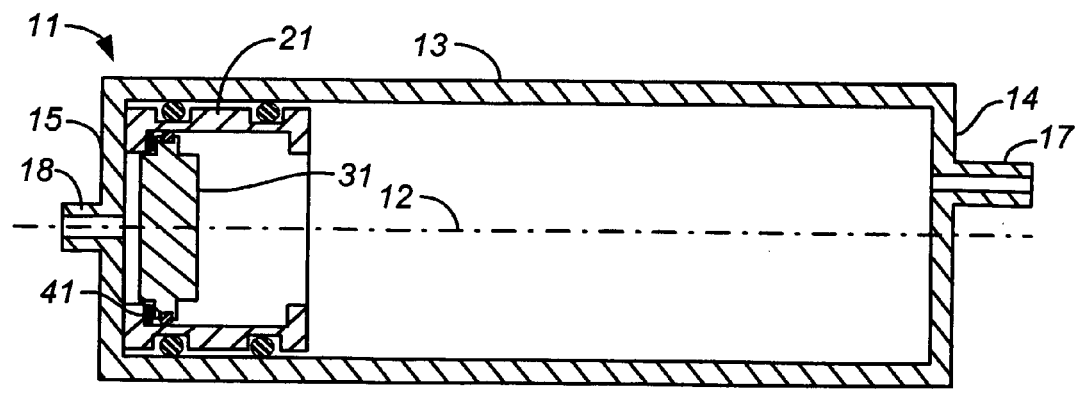
FIG. 3 is a cross section of the piston tank of FIG. 1a in a second stage of piston actuation.

FIG. 2 depicts the piston tank 11 in the first stage of actuation. Actuator fluid has been supplied through the inlet 17 to the actuator side of the plate 31 in this stage, at a sufficient pressure to force the plate against the bellows 41 and compress the bellows. To reach this stage, the volume of actuator fluid 42 within the tank expands and the plate 31 moves to the opposite end of the ring 21 at the extreme end of its travel relative to the ring, expelling through the tank outlet 18 a volume of functional fluid equal to that which occupied the interior of the ring. FIG. 3 depicts the piston tank 11 in a second stage of actuation. The pressure of the actuating fluid has been increased sufficiently in this stage to force all three moving parts, i.e., the plate 31, the compressed bellows 41, and the ring 21, all the way to the delivery end 15 of the tank, expelling the maximum amount of functional fluid from the tank through the outlet 18.

Figure 4:
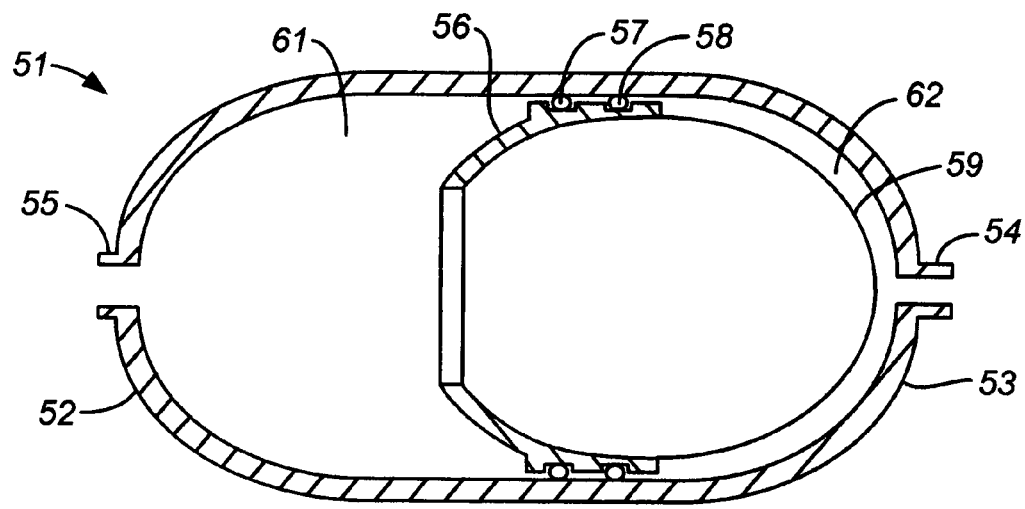
FIG. 4 is a cross section of a second type of piston tank embodying the present invention.
Figure 5:
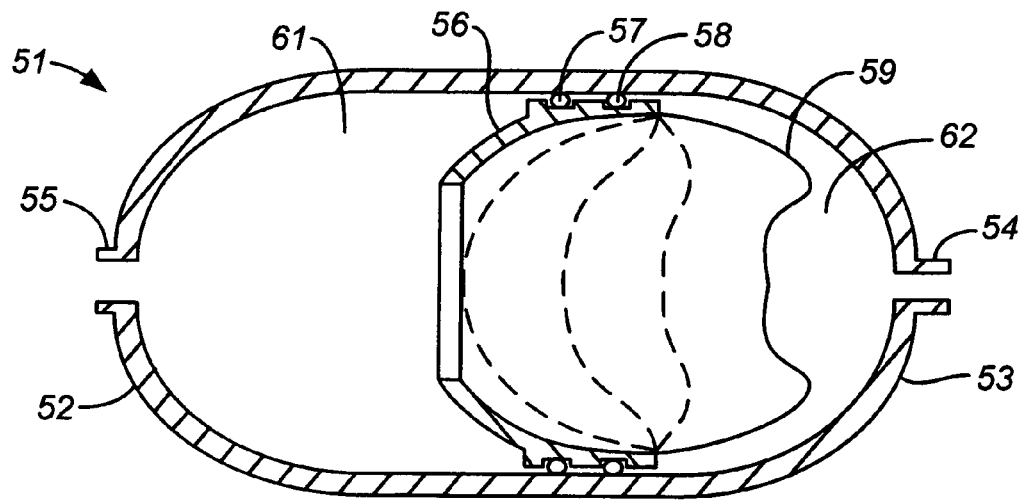
FIG. 5 is a cross section of the piston tank of FIG. 4 in intermediate stages of piston actuation.
Figure 6:
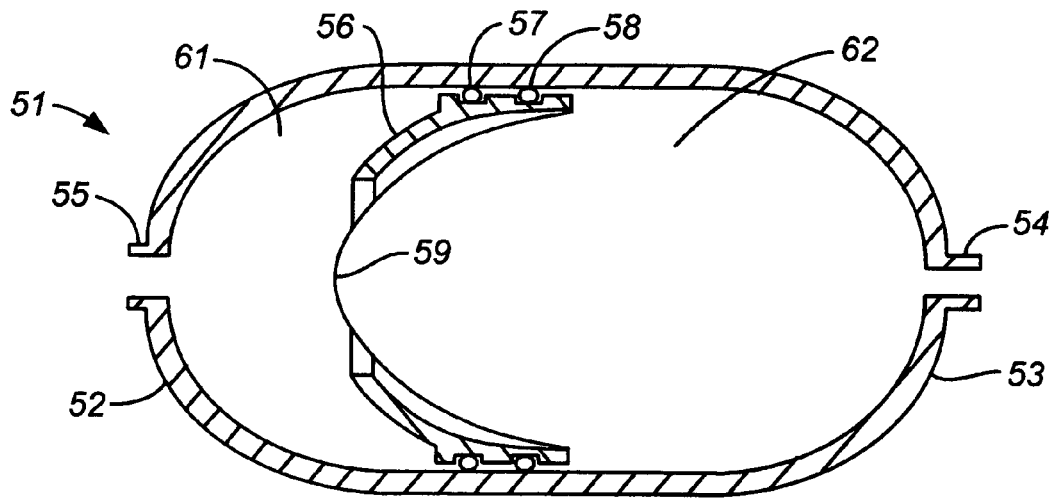
FIG. 6 is a cross section of the piston tank of FIG. 4 in and advanced stage of piston actuation.

FIGS. 4, 5, and 6 illustrate a piston tank in accordance with the invention in which a diaphragm serves as the barrier. The tank 51 in this embodiment is a body of revolution but with dome-shaped ends 52, 53. One of the ends 53 contains an inlet port 54 for the actuator fluid, and the other end 52 contains an outlet port 55 for the fuel. The carriage 56 is an elongate ring similar to the elongate ring 21 of FIGS. 1, 2, and 3 but contoured to conform to the dome-shaped end 52 at one end of the tank 51. Two elastomeric loops 57, 58 serve as dynamic seals in the same manner as the corresponding elastomeric loops 25, 26 of FIGS. 1a, 1b, 2, and 3. The diaphragm 59 is a flexible, fluid-impermeable material, and can be an elastomeric material. The diaphragm 59 divides the tank interior into a fuel compartment 61 and an actuator fluid compartment 62. FIG. 4 represents the condition of the tank when it is fully loaded with fuel and the actuator fluid is not pressurized sufficiently to eject any of the fuel from the tank. The diaphragm 59 in FIG. 4 is bowed toward the inlet port 54, maximizing the volume of the fuel compartment 61 and minimizing the volume of the actuator fluid compartment. Essentially the entire volume of the tank interior, including the interior of the ring 56, is thus filled with fuel.

As pressurized actuator fluid is fed through the inlet port 54, a pressure differential is imposed across the diaphragm 59, and the diaphragm contour changes as shown in the dashed lines of FIG. 5, compressing the volume of the fuel compartment 61 and ejecting fuel through the outlet port 55. As further actuator fluid enters the tank, the diaphragm becomes fully extended to the left, and when so extended, the diaphragm draws the ring 56 to the left as well, causing the two to move as a unit as shown in FIG. 6. With the ring 56 having the contours shown, the diaphragm presses against the interior of the ring, increasing the force on the ring. Ultimately, the ring 56 and diaphragm 59 together will rest against the end wall 52, displacing all fuel from the tank.

The foregoing is offered primarily for purposes of illustration. Further variations and modifications that utilize the novel features of this invention and accordingly fall within the scope of this invention will readily occur to the skilled engineer. In embodiments utilizing the bellows, for example, the bellows, which is shown on the side of the plate facing the tank outlet, can alternatively be placed on the opposite side of the plate, i.e., the side facing the actuator fluid inlet. Still further variations, likewise apparent to those skilled in the art, can be made as well.

What is claimed is:

1. A piston tank for ejecting a functional fluid in response to pressurization by an actuator fluid, said piston tank comprising:
    a cylindrical tank having an inner tank wall surface;
    a barrier mounted to a carriage disposed within said cylindrical tank, said barrier and said carriage individually movable within said tank, said carriage having an axially elongated peripheral sealing surface sealed against said inner tank wall surface by a dynamic shear seal, and said barrier movable relative to said carriage in response to changes in pressure differential across said barrier; and
    an actuator fluid inlet port and a functional fluid outlet port on opposing sides of said barrier.

2. The piston tank of claim 1 wherein said barrier is a rigid plate movable relative to said carriage.

3. The piston tank of claim 1 wherein said barrier is a deformable diaphragm.

4. The piston tank of claim 1 wherein said dynamic shear seal is comprised of at least two elastomeric loops encircling said peripheral sealing surface of said carriage.

5. The piston tank of claim 1 wherein said cylindrical tank, barrier and carriage are bodies of revolution about a common axis.

6. The piston tank of claim 1 wherein said carriage is an elongate ring, said barrier is a plate disposed within said ring, and said piston tank further comprises stop means at an end of said ring for retaining said plate within said ring.

7. The piston tank of claim 6 further comprising a bellows joining said plate and said ring.

8. The piston tank of claim 6 wherein said dynamic shear seal is comprised of at least two elastomeric loops encircling said peripheral sealing surface of said carriage, and said piston tank further comprises an elastomeric loop between the periphery of said plate and said carriage.

9. The piston tank of claim 7 wherein said bellows is resilient and extended when relaxed.

10. The piston tank of claim 6 wherein said stop means is an inwardly extending shoulder on said ring.

* * * * *